(12) United States Patent
Lee et al.

(10) Patent No.: US 7,692,255 B2
(45) Date of Patent: Apr. 6, 2010

(54) ELECTRODE LAYER FOR CAPACITORS, METHOD OF MANUFACTURING THE ELECTRODE LAYER, UNIT SENSOR USING THE ELECTRODE LAYER, AND TACTILE SENSOR USING THE UNIT SENSOR

(75) Inventors: Hyung-Kew Lee, Gyeonggi-do (KR); Kwang-Seok Yun, Gyeongsangbuk-do (KR); Euisik Yoon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 828 days.

(21) Appl. No.: 11/336,764

(22) Filed: Jan. 23, 2006

(65) Prior Publication Data

US 2006/0267140 A1 Nov. 30, 2006

(30) Foreign Application Priority Data

May 26, 2005 (KR) ...................... 10-2005-0044570

(51) Int. Cl.
*H01L 29/84* (2006.01)
(52) U.S. Cl. ...................... 257/414; 257/415; 257/417; 257/532; 257/E29.324; 73/862.046
(58) Field of Classification Search ................ 257/414, 257/415, 417, 418, 419, 532, E29.324; 438/48, 438/50, 51; 73/862.041–862.046; 361/283.1; 324/661
See application file for complete search history.

(56) References Cited

U.S. PATENT DOCUMENTS

| 4,574,438 | A | * | 3/1986 | Diepers et al. | ............. 29/25.35 |
| 4,766,389 | A | | 8/1988 | Rhoades et al. | |
| 5,225,959 | A | | 7/1993 | Stearns | |
| 6,826,968 | B2 | | 12/2004 | Manaresi et al. | |
| 2004/0080486 | A1 | * | 4/2004 | Troxell et al. | ............... 345/156 |
| 2006/0016275 | A1 | * | 1/2006 | Gravesen et al. | ....... 73/862.042 |

* cited by examiner

*Primary Examiner*—Sue Purvis
*Assistant Examiner*—Leslie Pilar Cruz
(74) *Attorney, Agent, or Firm*—Oliff & Berridge, PLC (57) ABSTRACT

Disclosed herein are an electrode layer for capacitors, a method of manufacturing the electrode layer, a unit sensor using the electrode layer, and a tactile sensor using the unit sensor. The electrode layer comprises a polymer substrate, an electrode formed on the polymer substrate, and a signal transmission line formed on the polymer substrate such that the signal transmission line is connected to the electrode. The unit sensor comprises upper and lower electrode layers, which are identical to the above-described electrode, and a spacer layer made of polymer. According to the present invention, the sensor can be easily manufactured while the sensor has high flexibility and easy extensionabilty.

15 Claims, 6 Drawing Sheets

ELECTRODE LAYER FOR CAPACITORS, METHOD OF MANUFACTURING THE ELECTRODE LAYER, UNIT SENSOR USING THE ELECTRODE LAYER, AND TACTILE SENSOR USING THE UNIT SENSOR

BACKGROUND OF THE INVENTION

1. Field of the Invention

The present invention relates to an electrode layer for capacitors, a method of manufacturing the electrode layer, a unit sensor using the electrode layer, and a tactile sensor using the unit sensor. More particularly, the present invention relates to an electrode layer for flexible capacitors that can be manufactured using a flexible substrate and that can be extended, a method of manufacturing the electrode layer, a unit sensor using the electrode layer, and a tactile sensor using the unit sensor.

2. Description of the Related Art

Much research has been carried out into application of tactile sensors to robots. However, the research has failed to realize the commercial results until a recent date. With recent appearance of human robots, the research has increasingly focused on the human robots. For example, robots that can be utilized in real lives of humans, such as a cleaning robot named "Roomba," have been placed on the market. Consequently, the robots will have an influence on many parts of human life in addition to special purposes, such as factories. It is required that the robots have a tactile sensation to interact with humans. As a result, the necessity of tactile sensors for robots is being increased. The tactile sensors must be as flexible and soft as human skin. Furthermore, the tactile sensors and the systems in the tactile sensors must be protected from external impacts. In addition, the tactile sensors must be freely located over desired areas.

Most tactile sensors developed for robots are made of flexible polyimide-based plastic, rubber, or cloth. Also, the tactile sensors have a thin plate-shaped two-dimensional array structure. A Pressure sensor is a sensor whose resistance or capacitance is changed by pressure. A typical example of a pressure sensor is disclosed in U.S. Pat. No. 6,826,968. However, the developed tactile sensors have problems in that high resolution of below 1 mm, which is similar to human skin, cannot be realized due to the restrictions of a manufacturing process, and that interference between neighboring unit sensors is great, and the tactile sensors cannot be freely located over desired areas due to structural restrictions.

SUMMARY OF THE INVENTION

Therefore, the present invention has been made in view of the above problems.

It is an object of the present invention to provide an electrode layer for capacitors having high flexibility and a method of manufacturing the electrode layer.

It is another object of the present invention to provide a unit sensor that can be easily manufactured while the unit sensor has high flexibility and resolution.

It is yet another object of the present invention to provide a tactile sensor having high flexibility and easy extensionabilty.

In accordance with one aspect of the present invention, the above and other objects can be accomplished by the provision of an electrode layer for capacitors whose capacitance is changed depending upon the variation in distance between two electrode layers, wherein the electrode layer comprises: a polymer substrate; an electrode formed on the polymer substrate; and a signal transmission line formed on the polymer substrate such that the signal transmission line is connected to the electrode.

In accordance with another aspect of the present invention, there is provided a method of manufacturing an electrode layer for capacitors wherein the method comprises the steps of: forming a sacrifice layer on a silicon substrate; forming an electrode and a signal transmission line at a predetermined area on the sacrifice layer; coating the sacrifice layer, on which the electrode and the signal transmission line are formed, with liquid-state polymer, and hardening the liquid-state polymer; and removing the silicon substrate and the sacrifice layer.

In accordance with another aspect of the present invention, there is provided a unit sensor comprising: an upper electrode layer including a polymer substrate, an upper electrode formed on the polymer substrate, and a signal transmission line formed on the polymer substrate such that the signal transmission line extends in the side-to-side direction of the upper electrode; a lower electrode layer including a polymer substrate, a lower electrode formed on the polymer substrate, and a signal transmission line formed on the polymer substrate such that the signal transmission line extends in the front-to-rear direction of the lower electrode; and a spacer layer, made of polymer, disposed between the upper electrode layer and the lower electrode layer, the spacer layer being provided at a predetermined area thereof with an opening, through which the upper electrode and the lower electrode face each other.

Preferably, the unit sensor further comprises an insulating layer, made of polymer, disposed between the upper electrode layer and the spacer layer. Alternatively, the insulating layer may be disposed between the lower electrode layer and the spacer layer.

Preferably, the unit sensor further comprises a bump layer, made of polymer, disposed on the upper electrode layer.

In accordance with yet another aspect of the present invention, there is provided a tactile sensor comprising: a unit sensor array including a plurality of unit sensors formed in a two-dimensional array, the upper electrodes of the unit sensors being electrically connected with each other by the sequential interconnection of the signal transmission lines for the upper electrodes, the lower electrodes of the unit sensors being electrically connected with each other by the sequential interconnection of the signal transmission lines for the lower electrodes; and connection lines disposed at the ends of the signal transmission lines for the upper electrodes and the signal transmission lines for the lower electrodes to connect the unit sensor array to the outside.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1A:
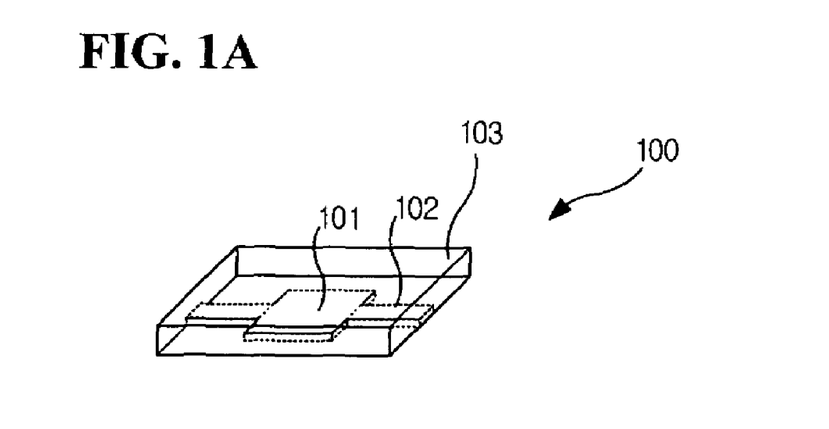
FIG. 1A is a perspective view schematically illustrating an electrode layer for capacitors according to a preferred embodiment of the present invention.
Figure 1B:
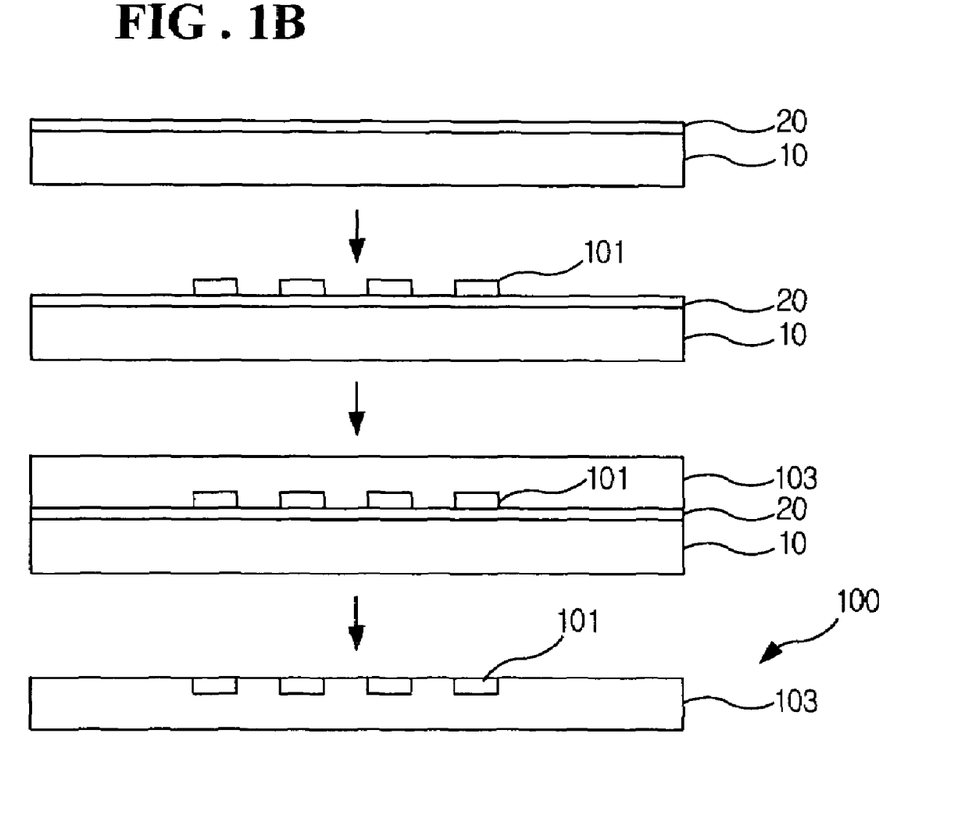
FIG. 1B is a sectional view schematically illustrating a method of manufacturing the electrode layer for capacitors shown in FIG. 1A.
Figure 2A:
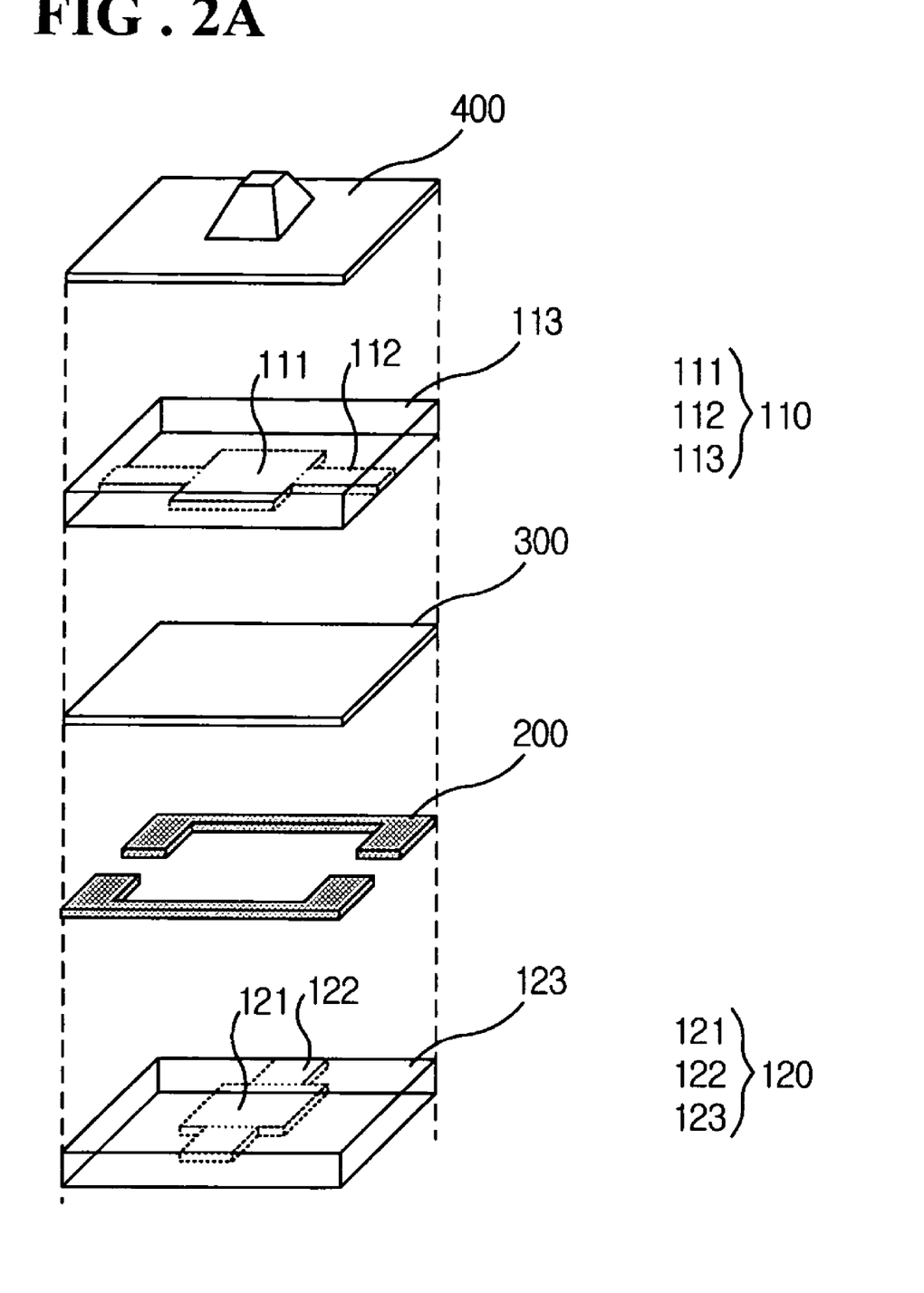
FIGS. 2A and 2B are an exploded perspective view and a sectional view schematically illustrating a unit sensor using the electrode layer for capacitors shown in FIG. 1A.
Figure 2B:
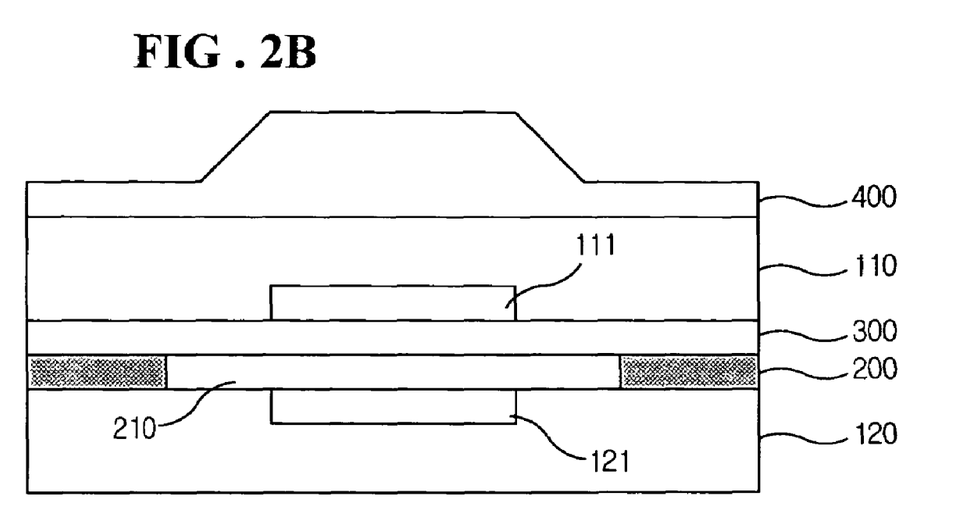
Figure 3A:
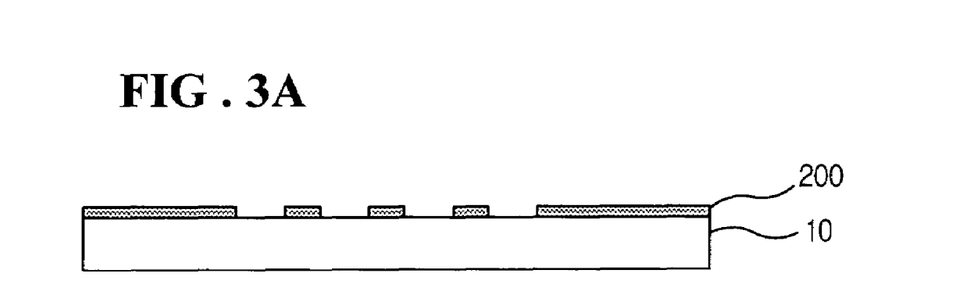
FIG. 3A is a sectional view schematically illustrating a method of manufacturing a spacer layer used in the unit sensor shown in FIGS. 2A and 2B.
Figure 3B:
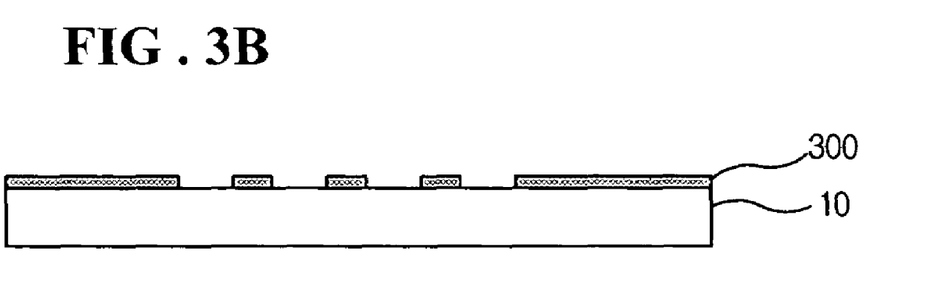
FIG. 3B is a sectional view schematically illustrating a method of manufacturing an insulating layer used in the unit sensor shown in FIGS. 2A and 2B.
Figure 3C:
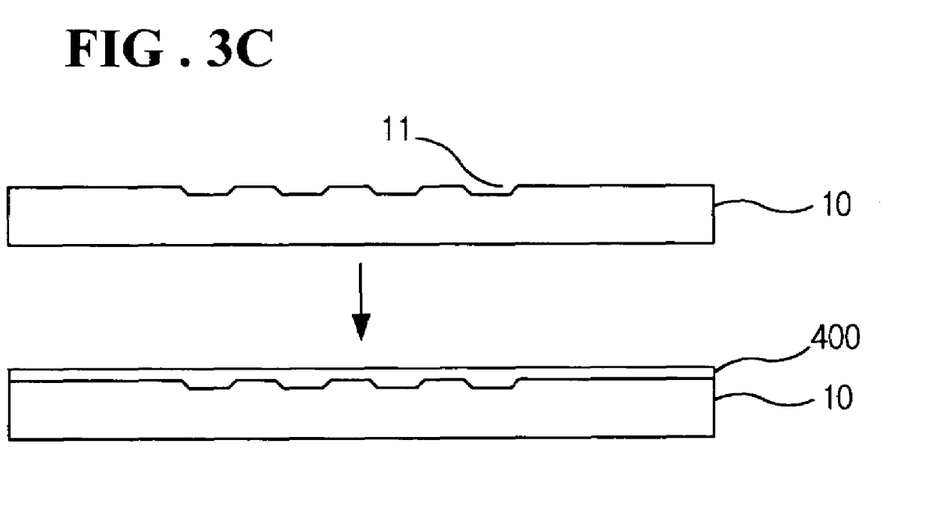
FIG. 3C is a sectional view schematically illustrating a method of manufacturing a bump layer used in the unit sensor shown in FIGS. 2A and 2B.
Figure 3D:
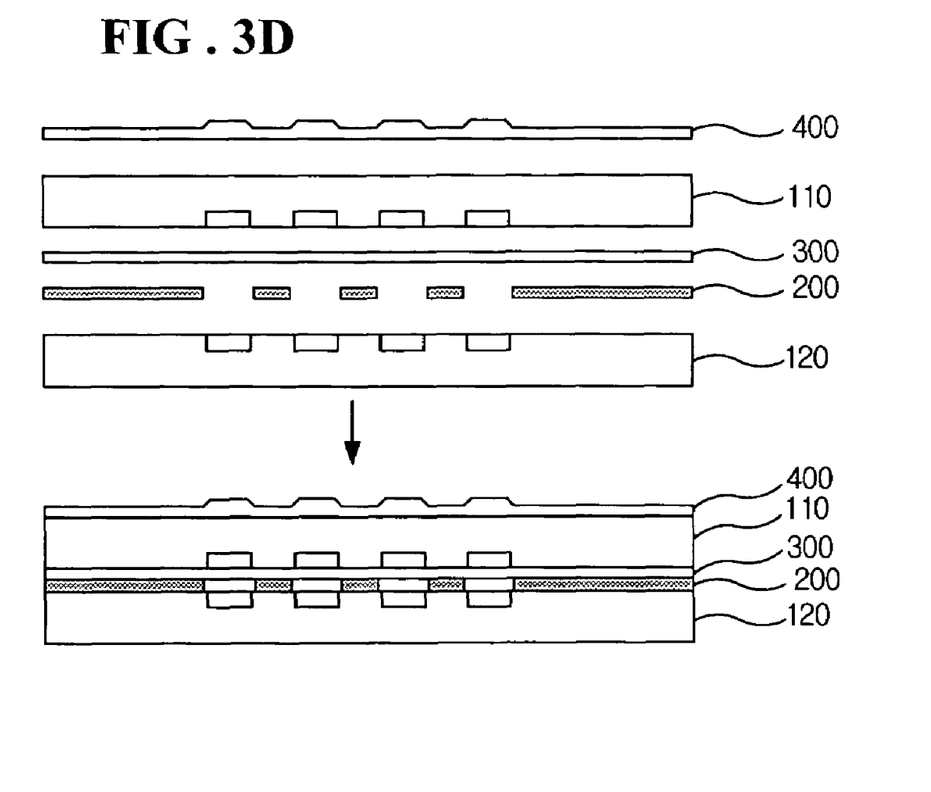
FIG. 3D is a sectional view schematically illustrating a method of manufacturing a unit sensor using the spacer layer, the insulating layer, and the bump layer shown in FIGS. 3A to 3C, respectively.
Figure 4:
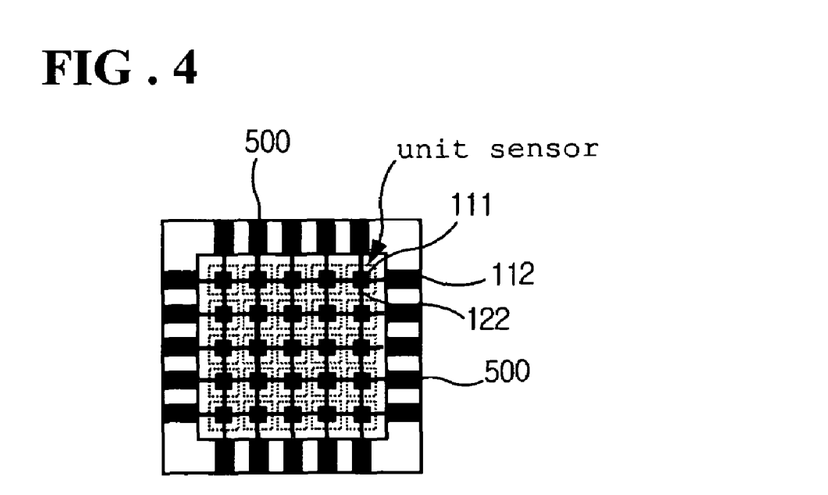
FIG. 4 is a plan view schematically illustrating a tactile sensor using the unit sensor shown in FIGS. 2A and 2B.
Figure 5:
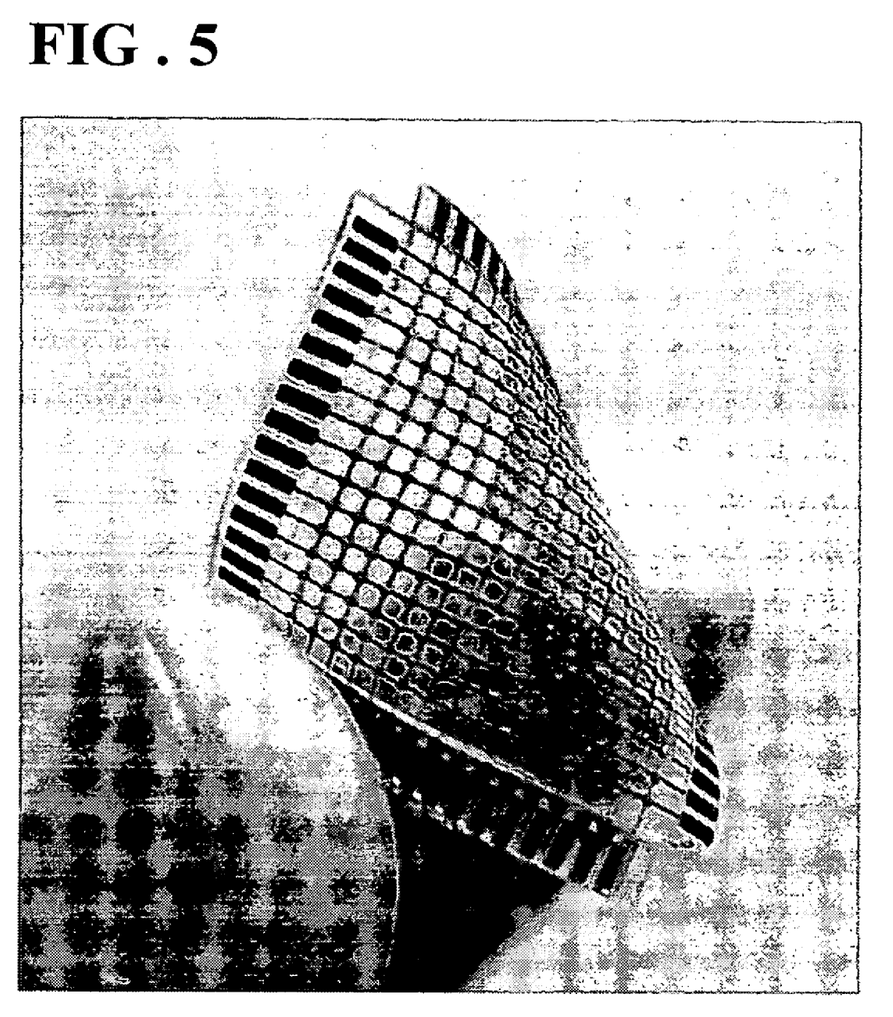
FIG. 5 is a photograph of the tactile sensor shown in FIG. 4.

FIG. 1A is a perspective view schematically illustrating an electrode layer for capacitors according to a preferred embodiment of the present invention, FIG. 1B is a sectional view schematically illustrating a method of manufacturing the electrode layer for capacitors shown in FIG. 1A, FIGS. 2A and 2B are an exploded perspective view and a sectional view schematically illustrating a unit sensor using the electrode layer for capacitors shown in FIG. 1A, FIG. 3A is a sectional view schematically illustrating a method of manufacturing a spacer layer used in the unit sensor shown in FIGS. 2A and 2B, FIG. 3B is a sectional view schematically illustrating a method of manufacturing an insulating layer used in the unit sensor shown in FIGS. 2A and 2B, FIG. 3C is a sectional view schematically illustrating a method of manufacturing a bump layer used in the unit sensor shown in FIGS. 2A and 2B, FIG. 3D is a sectional view schematically illustrating a method of manufacturing a unit sensor using the spacer layer, the insulating layer, and the bump layer shown in FIGS. 3A to 3C, respectively, FIG. 4 is a plan view schematically illustrating a tactile sensor using the unit sensor shown in FIGS. 2A and 2B, and FIG. 5 is a photograph of the tactile sensor shown in FIG. 4.

First Embodiment

The first embodiment of the present invention relates to an electrode layer used for capacitors whose capacitance is changed depending upon the variation in distance between two electrode layers.

Referring to FIG. 1A, the electrode layer 100 according to the first embodiment of the present invention comprises a substrate 103, an electrode 101, and a signal transmission line 102.

The substrate 103 is made of flexible polymer, such as silicon-based rubber or polyimide.

The electrode 101 and the signal transmission line 102 are formed on the substrate 103. The signal transmission line 102 is connected to the electrode 101. Consequently, a signal generated by the change in capacitance of a capacitor, in which the electrode layer 100 according to this embodiment is used, is transmitted to the outside though the signal transmission line 102.

Referring to FIG. 1B, which illustrates a method of manufacturing the electrode layer 100, a sacrifice layer 20 is formed on a silicon substrate 10. Next, a predetermined area on the sacrifice layer 20 is electroplated with a conductive material, such as copper or gold, to form an electrode 101 and a signal transmission line 102. Subsequently, the sacrifice layer 20, on which the electrode 101 and the signal transmission line 102 are formed, is coated with liquid-state polymer, and then the liquid-state polymer is hardened, to form a substrate 103. Finally, the silicon substrate 10 and the sacrifice layer 20 are removed to manufacture an electrode layer 100, which comprises the substrate 103, the electrode 101, and the signal transmission line 102.

Using the electrode layer according to the first embodiment of the present invention allows a very flexible capacitor array to be manufactured.

Second Embodiment

The second embodiment of the present invention relates to a unit sensor using the electrode layer according to the first embodiment of the present invention as described in detail above.

Referring to FIGS. 2A and 2B, the unit sensor according to the second embodiment of the present invention comprises a lower electrode layer 120, a spacer layer 200 stacked on the lower electrode layer 120, an insulating layer 300 stacked on the spacer layer 200, an upper electrode layer 110 stacked on the insulating layer 300, and a bump layer 400 stacked on the upper electrode layer 110.

The upper electrode layer 110 comprises an upper electrode 111, a signal transmission line 112, and a polymer substrate 113. The lower electrode layer 120 comprises a lower electrode 121, a signal transmission line 122, and a polymer substrate 123. The upper electrode layer 110 and the lower electrode layer 120 are identical to the electrode layer 100 according to the first embodiment of the present invention as described in detail, and therefore, a detailed description of the upper electrode layer 110 and the lower electrode layer 120 will not be given. However, the signal transmission line 112 of the upper electrode layer 110 extends in the side-to-side direction of the upper electrode 111, and the signal transmission line 122 of the lower electrode layer 120 extends in the front-to-rear direction of the lower electrode 121. Consequently, the signal transmission line 112 of the upper electrode layer 110 is perpendicular to the signal transmission line 122 of the lower electrode layer 120, when the unit sensor is shown in a plan view.

The spacer layer 200 is disposed between the lower electrode layer 120 and the upper electrode layer 110. The spacer layer 200 is provided at a predetermined area thereof with an opening 210, through which the upper electrode 111 and the lower electrode 121 face each other. Consequently, the upper electrode 111 of the upper electrode layer 110 and the lower electrode 121 of the lower electrode layer 120 face each other through the opening 210 formed at the spacer layer 200, and the capacitance is changed depending upon the increase or decrease in the distance between the upper electrode 111 and the lower electrode 121.

Referring to FIG. 3A in connection with FIGS. 2A and 2B, the spacer layer 200 is prepared by applying liquid-state polymer to a silicon substrate 10, hardening the liquid-state polymer, forming a pattern using photolithography, forming the opening 210 through the polymer using dry etching, and removing the silicon substrate 10. When the photolithography is used to form the spacer layer 200 as described above, high resolution of below 1 mm is accomplished.

Referring back to FIGS. 2A and 2B, the insulating layer 300 is disposed between the upper electrode layer 110 and the spacer layer 200 to prevent the upper electrode 111 and the lower electrode 121 from contacting each other. The insulating layer 300 may be disposed between the lower electrode layer 120 and the spacer layer 200.

Referring to FIG. 3B in connection with FIGS. 2A and 2B, the insulating layer 300 is prepared by applying liquid-state polymer to a silicon substrate 10, hardening the liquid-state polymer, and removing the silicon substrate 10.

Referring back to FIGS. 2A and 2B, the bump layer 400 is disposed on the upper electrode layer 110 such that pressure applied by a user can be reliably transmitted to the upper electrode layer 110.

Referring to FIG. 3C in connection with FIGS. 2A and 2B, the bump layer 400 is prepared by etching the silicon substrate 10 to form a bump mold 11, applying liquid-state polymer to a silicon substrate 10, on which the bump mold 11 is formed, hardening the liquid-state polymer, and removing the silicon substrate 10.

Not only the substrates 112 and 123, which are used for the upper electrode layer 110 and the lower electrode layer 120, but also the spacer layer 200, the insulating layer 300, and the bump layer 400 are made of polymer, such as silicon-based rubber or polyimide.

The spacer layer 200, the insulating layer 300, the upper electrode layer 110, the bump layer 300, and the lower electrode layer 120, which are prepared as described above, are attached to each other, such that the spacer layer 200, the insulating layer 300, the upper electrode layer 110, and the bump layer 300 are sequentially stacked on the lower electrode layer 120, to manufacture the unit sensor as shown in FIG. 3D. Attachment of the spacer layer 200, the insulating layer 300, the upper electrode layer 110, the bump layer 300, and the lower electrode layer 120 is not particularly restricted. For example, the surfaces of the spacer layer 200, the insulating layer 300, the upper electrode layer 110, the bump layer 300, and the lower electrode layer 120 to be attached are treated using oxygen plasma, and are then aligned with each other. Subsequently, the surfaces are attached to each other, and then the attached surfaces are heated to a temperature of 60° C. for approximately 50 minutes.

The operation of the unit sensor according to the second embodiment of the present invention is as follows: when a user pushes the bump layer 400, the distance between the upper electrode 111 and the lower electrode 121 is decreased, and therefore, the capacitance between the upper electrode 111 and the lower electrode 121 is increased. As a result, a signal generated by the change of the capacitance is transmitted to an external circuit though the signal transmission line 122 connected between the external circuit and the lower electrode 121. When the pressure applied to the bump layer 400 is released, the distance between the upper electrode 111 and the lower electrode 121 is increased, and therefore, the capacitance between the upper electrode 111 and the lower electrode 121 is decreased. As a result, a signal generated by the change of the capacitance is transmitted to an external circuit though the signal transmission line 112 connected between the external circuit and the upper electrode 111.

The unit sensor according to the second embodiment of the present invention is manufactured using the liquid-state polymer. Consequently, the unit sensor is easily manufactured, and the manufactured unit sensor has high flexibility.

Third Embodiment

The third embodiment of the present invention relates to a tactile sensor using the unit sensor according to the second embodiment of the present invention as described in detail above.

Referring to FIG. 4, the tactile sensor according to the third embodiment of the present invention comprises a unit sensor array including a plurality of unit sensors with the above-stated construction according to the second embodiment of the present invention, which are arrayed in two dimensions, and connection lines 500.

The upper electrodes 111 of the unit sensors constituting the unit sensor array are electrically connected with each other by the sequential interconnection of the signal transmission lines 112 for the upper electrodes. The lower electrodes of the unit sensors constituting the unit sensor array are electrically connected with each other by the sequential interconnection of the signal transmission lines 122 for the lower electrodes. The connection lines 500 are disposed at the ends of the sequentially interconnected signal transmission lines 112 for the upper electrodes and the sequentially interconnected signal transmission lines 122 for the lower electrodes.

It can be seen from FIG. 5 that the tactile sensor according to the third embodiment of the present invention has high flexibility.

As described above, the tactile sensor according to the third embodiment of the present invention is manufactured using the flexible unit sensors, and therefore, the tactile sensor according to the third embodiment of the present invention is very flexible. Furthermore, an extension to the tactile sensor according to the third embodiment of the present invention can be easily accomplished using the connection lines.

As apparent from the above description, the present invention has the following effects.

In the electrode layer and the unit sensor according to the present invention, the substrate is formed using the liquid-state polymer. Consequently, the electrode layer and the unit sensor are very flexible and easily manufactured. In addition, the photolithography is used to form the spacer layer of the unit sensor, and therefore, high resolution of below 1 mm is accomplished.

The tactile sensor according to the present invention is manufactured using flexible unit sensors, and therefore, the tactile sensor has high flexibility and easy extensionabilty.

Consequently, the tactile sensor according to the present invention can be applied to the soles of shoes as well as robots. In the case that the tactile sensor according to the present invention is applied to the soles of the shoes, the distribution of the pressure applied to the feet of a person when the person walks may be measured by the tactile sensor, and the measured data may be utilized medically. Also, the tactile sensor has soft tactile sensation. Consequently, the tactile sensor can provide various interfaces between a human and a computer as an extension to an input device, such as a mouse.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A unit sensor comprising:
   an upper electrode layer including a polymer substrate, an upper electrode embeddedly formed in the center of the polymer substrate in a relatively wide width, and a signal transmission line embeddedly formed in the polymer substrate in a relatively narrow width such that the signal transmission line extends in the side-to-side direction of the upper electrode;
   a lower electrode layer including a polymer substrate, a lower electrode embeddedly formed in the center of the polymer substrate in a relatively wide width, and a signal transmission line embeddedly formed in the polymer substrate in a relatively narrow width such that the signal transmission line extends in the front-to-rear direction of the lower electrode;
   a spacer layer, made of polymer, disposed between the upper electrode layer and the lower electrode layer, the spacer layer being provided at a corresponding position surrounding the upper electrode and the signal transmission line of the upper electrode layer and having an opening, through which the upper electrode and the lower electrode face each other without blocking of the spacer; and a bump layer, made of polymer, disposed on the upper electrode layer and having a bump at its center.

2. The unit sensor as set forth in claim 1, wherein the spacer layer is prepared by applying liquid-state polymer to a silicon substrate, hardening the liquid-state polymer, forming a pattern using photolithography, forming the opening using dry etching, and removing the silicon substrate.

3. The unit sensor as set forth in claim 1, wherein the bump layer is prepared by applying liquid-state polymer to a silicon substrate, on which a bump mold is formed, hardening the liquid-state polymer, and removing the silicon substrate.

4. The unit sensor as set forth in claim 1, wherein the polymer is silicon-based rubber or polyimide.

5. A tactile sensor using the unit sensor as set forth in claim 1, wherein the tactile sensor comprises:
   a unit sensor array including a plurality of unit sensors formed in a two-dimensional array, the upper electrodes of the unit sensors being electrically connected with each other by the sequential interconnection of the signal transmission lines for the upper electrodes, the lower electrodes of the unit sensors being electrically connected with each other by the sequential interconnection of the signal transmission lines for the lower electrodes; and
   connection lines disposed at the ends of the signal transmission lines for the upper electrodes and the signal transmission lines for the lower electrodes to connect the unit sensor array to the outside.

6. The unit sensor as set forth in claim 1, wherein the polymer is silicon-based rubber or polyimide.

7. A tactile sensor using the unit sensor as set forth in claim 1, wherein the tactile sensor comprises:
   a unit sensor array including a plurality of unit sensors formed in a two-dimensional array, the upper electrodes of the unit sensors being electrically connected with each other by the sequential interconnection of the signal transmission lines for the upper electrodes, the lower electrodes of the unit sensors being electrically connected with each other by the sequential interconnection of the signal transmission lines for the lower electrodes; and
   connection lines disposed at the ends of the signal transmission lines for the upper electrodes and the signal transmission lines for the lower electrodes to connect the unit sensor array to the outside.

8. The unit sensor as set forth in claim 1, further comprising:
   an insulating layer, made of polymer, disposed between the upper electrode layer and the spacer layer.

9. The unit sensor as set forth in claim 8, wherein the insulating layer is prepared by applying liquid-state polymer to a silicon substrate, hardening the liquid-state polymer, and removing the silicon substrate.

10. The unit sensor as set forth in claim 8, wherein the polymer is silicon-based rubber or polyimide.

11. A tactile sensor using the unit sensor as set forth in claim 8, wherein the tactile sensor comprises:
    a unit sensor array including a plurality of unit sensors formed in a two-dimensional array, the upper electrodes of the unit sensors being electrically connected with each other by the sequential interconnection of the signal transmission lines for the upper electrodes, the lower electrodes of the unit sensors being electrically connected with each other by the sequential interconnection of the signal transmission lines for the lower electrodes; and
    connection lines disposed at the ends of the signal transmission lines for the upper electrodes and the signal transmission lines for the lower electrodes to connect the unit sensor array to the outside.

12. The unit sensor as set forth in claim 1, further comprising:
    an insulating layer, made of polymer, disposed between the lower electrode layer and the spacer layer.

13. The unit sensor as set forth in claim 12, wherein the insulating layer is prepared by applying liquid-state polymer to a silicon substrate, hardening the liquid-state polymer, and removing the silicon substrate.

14. The unit sensor as set forth in claim 12, wherein the polymer is silicon-based rubber or polyimide.

15. A tactile sensor using the unit sensor as set forth in claim 12, wherein the tactile sensor comprises:
    a unit sensor array including a plurality of unit sensors formed in a two-dimensional array, the upper electrodes of the unit sensors being electrically connected with each other by the sequential interconnection of the signal transmission lines for the upper electrodes, the lower electrodes of the unit sensors being electrically connected with each other by the sequential interconnection of the signal transmission lines for the lower electrodes; and
    connection lines disposed at the ends of the signal transmission lines for the upper electrodes and the signal transmission lines for the lower electrodes to connect the unit sensor array to the outside.

* * * * *